Oct. 15, 1957   J. F. DEMENT ET AL   2,809,446
INSTRUMENT FOR NON-FLYING AIRCRAFT TRAINERS
Filed June 30, 1953   2 Sheets-Sheet 1

INVENTORS
JAMES F. DEMENT
JOSEPH B. IMBRIACO
HOWARD H. J. BENSON Jr.
MORRIS ACKERMAN
BY
Scrivener & Parker
ATTORNEYS Oct. 15, 1957  J. F. DEMENT ET AL  2,809,446
INSTRUMENT FOR NON-FLYING AIRCRAFT TRAINERS
Filed June 30, 1953  2 Sheets-Sheet 2
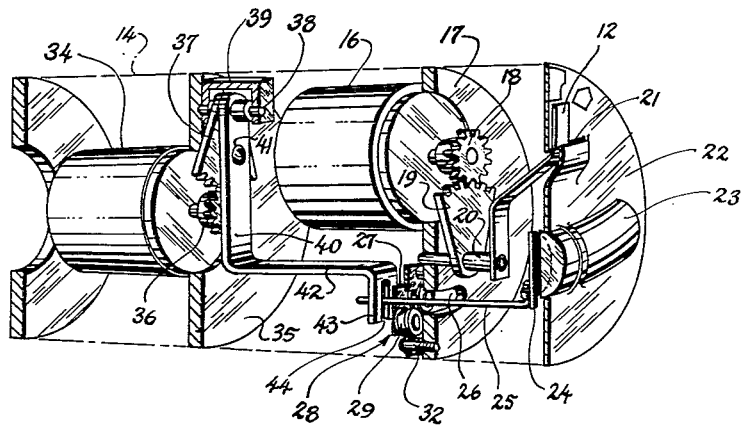
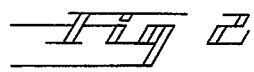
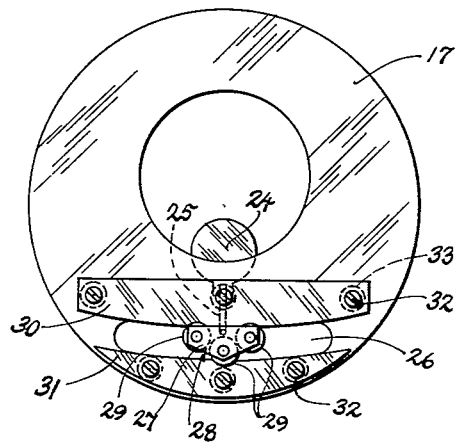
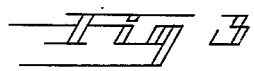
INVENTORS
JAMES F. DEMENT
JOSEPH B. IMBRIACO
HOWARD H. J. BENSON Jr.
MORRIS ACKERMAN
BY Scrivener & Parker
ATTORNEYS

United States Patent Office 2,809,446
Patented Oct. 15, 1957

2,809,446

INSTRUMENT FOR NON-FLYING AIRCRAFT TRAINERS

James F. Dement, Alexandria, Va., and Joseph B. Imbriaco, Landover, Howard H. J. Benson, Jr., Hyattsville, and Morris Ackerman, Chevy Chase, Md., assignors, by mesne assignments, to ACF Industries, Incorporated, a corporation of New Jersey Application June 30, 1953, Serial No. 365,114

7 Claims. (Cl. 35—12)

This invention relates to non-flying aircraft trainers and more particularly to a turn-and-bank indicator for use in such trainers.

Heretofore, in non-flying aircraft trainers it has been customary to include instruments similar in all respects to those actually used in aircraft except in the case of the turn-and-bank indicator. As actually used on aircraft the turn indicator comprises a pointer movable between left and right positions to indicate to the pilot, particularly during blind flying conditions, his direction of turn.

Associated with the turn indicator is a bank instrument which indicates to the pilot when the plane is in stable flight. One such type of bank instrument employs a ball that is movable under the influence of natural forces in an arcuately curved glass tube of liquid. The ball is so arranged that it will move from a neutral position toward opposite ends in accordance with the degree of bank of the plane except as those movements might be influenced by lateral forces, as for example, centrifugal force. Normally, a pilot endeavors to maintain the ball in its central, neutral position while banked for turning as well as during level flight.

In non-flying aircraft trainers where the natural forces affecting the ball bank indicator are necessarily absent, it has been customary heretofore to simulate ball movement by rotating or rocking the entire instrument so that the ball will be positioned by gravity. Such an instrument is not satisfactory because when the trainee has become familiar with the rocking tube and ball of the trainer, he finds an entirely foreign situation when he encounters the actual instruments in an aircraft.

Hence, it is an object of the present invention to provide a turn-and-bank indicator for non-flying aircraft trainers which faithfully simulates the action of such an instrument in actual aircraft flight.

Another object of the invention is to provide a turn-and-bank indicator of the type described which simulates faithfully the appearance of a ball within a tube of liquid without actually utilizing the same.

Another object of the invention is to provide a bank indicator which faithfully simulates an actual indicator by the movement of a ball-simulating body behind a transparent magnifying lens member corresponding substantially in appearance to the aforesaid liquid-filled arcuate tube.

Yet another object of the invention is to provide a novel means for supporting and moving said disc with respect to said magnifying device.

Other objects and their attendant advantages will become apparent as the following detailed description is read in conjunction with the accompanying drawings wherein:

Fig. 2 is an enlarged schematic view in perspective and partly in section of the present invention with the outer case thereof removed.

Fig. 3 is an enlarged rear detailed view of the plate containing the ball-simulating body supporting and guiding means of the present invention, parts of the mechanism of the present invention being removed.

Figure 1:
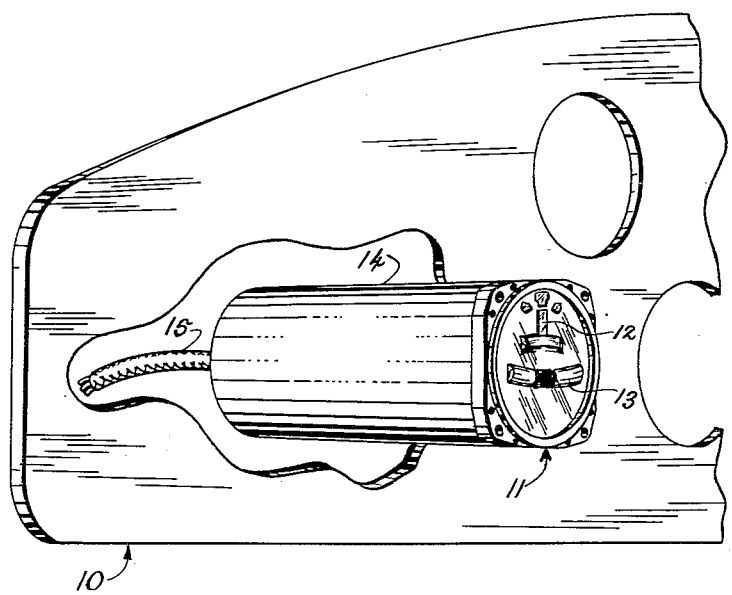
Fig. 1 is a schematic view in perspective of an instrument panel of a non-flying aircraft trainer with parts thereof broken away showing the bank-and-turn indicator of the present invention as it may appear to a pilot-trainee.

Referring now to Fig. 1, the numeral 10 designates an instrument panel suitably apertured for supporting a plurality of instruments as normally employed in aircraft and including a turn-and-bank indicator 11 of the type having a pointer 12 to indicate the direction of turn, and a bank indicator 13 which faithfully simulates that type of indicator employing a ball enclosed within a fluid-filled arcuate tube. The turn-and-bank indicator operating mechanism may be enclosed within a suitable housing 14 and may comprise suitable electrical motors and linkages more clearly shown in Fig. 2 and hereafter described in detail. The electrical driving devices may receive the required energization from remote sources (not shown) through cable 15, the remote sources receiving electrical control signals from trainee operated mechanisms, such as rudder and aileron controls, in a known manner as taught for example in the patent to Dehmel, No. 2,366,603, dated January 2, 1945.

With particular reference to Fig. 2, the turn indicator 12 shown is driven by a motor 16 attached in any suitable manner in a mounting plate 17 suitably secured in the housing 14 of the instrument. The motor 16 is energized for rotation by trainee actuation of flight control mechanism to drive, by means of pinion 18, a sector gear 19 and the pointer 12 whose lower ends are rotatably mounted in spaced relationship on a stub shaft 20 secured to plate 17. The pointer 12 may project in the manner shown through a suitable slot 21 in the dial face 22 of the instrument to indicate to the pilot-trainee deviation from a straight-flight course.

The bank indicator 13 comprises a novel arrangement of parts which faithfully reproduces the appearance of a ball enclosed in a fluid-filled transparent arcuate container. In place of the latter, however, there is provided an arcuate transparent lens member 23, constructed of suitable material such as glass, clear plastic or the like, which, viewed from the front, is similar in size and configuration in all respects with the normal liquid-filled tube found in actual aircraft. The lens 23 is transversely secured by any suitable means, such as by bonding at the edges in a properly formed slot in the dial face 22. Behind the lens 23 there is located in close proximity to the inner side thereof a ball simulating body 24 which may be of any suitable size and shape that when viewed through the lens, reproduces in size and configuration a normal ball in a conventional liquid filled tube. A substantially flat disc of a color on the forward face thereof corresponding to a normal ball has been found preferable though it should be understood that any ball-simulating body producing the desired effect may be utilized. For purposes of this description, though not limited thereto, the ball simulating body 24 will hereafter be referred to as a disc.

It should be understood that lens 23 is so constructed and formed that it has substantially the same light distorting and magnifying properties as would a hollow tube of similar dimensions which is filled with a clear liquid. In a preferred embodiment we find that a solid clear plastic lens having a flat inner surface and an outer surface of semi-circular cross section provides excellent results, though glass or other suitable material could of course be used. This lens is an important feature of the present invention since it provides the student with a substantially exact reproduction of the appearance of a ball in an actual bank indicator thereby rendering this instrument completely familiar to him upon his first entering an actual aircraft. This is not the case in the majority of prior art devices which merely move a flat plate behind an open slot in a dial face with no attempt at accurately reproducing the conformation and appearance of the actual ball or the actual tube.

The disc 24 is driven transversely by a novel system of linkages and is so guided in its transverse movement as to maintain a substantially vertical relationship with the transverse center line of lens 23 thereby eliminating ball distortion at the extremities of lens 23 that would occur if the disc 24 were merely driven horizontally with respect to said lens. To accomplish this, the disc 24 is driven in an arcuate path whose degree of curvature is determined by the same center point as the curving lens 23. This may be done in a variety of manners and in the preferred embodiment shown in Figs. 2 and 3 disc 24 is mounted on the vertical end of an L-shaped supporting rod 25 which projects rearwardly through an arcuate slot 26 in plate 17 and is fixed in and extends rearwardly through a plate 27 of a movable carriage member 28.

Fig. 3 illustrates the carriage 28 and it should be noted in this figure that turn indicator motor 16 and associated mechanisms have been removed for greater clarity so that the rear of disc 24 is partly observable through the hole in plate 17 normally supporting motor 16. The carriage 28 comprises the plate 27 and three identical flanged wheels 29 engaging with and riding on tracks formed by the inner arcuate edges of upper and lower guide plates 30 and 31 which are fixed in spaced relationship with respect to plate 17 by means of suitable machine screws 32 and spacers 33. As indicated before, the degree of curvature of the edges of plates 30 and 31 and of slot 26 are determined by the same center point as determines the degree of curvature of lens 23, so that when carriage 28 is moved, disc 24 remains at the same distance from said center point and thus retains its correct relationship with respect to lens 23.

Carriage 28 and hence disc 24 are actuated through the medium of a suitable electric motor 34 which is energized from an electrical source (not shown) that combines in a manner well known in the art a plurality of signals determined by trainee positioning of the aircraft flight controls to reproduce electrically the variety of forces which would occur in an actual aircraft. Thus when the trainee has operated the controls, say, to make a left turn but has not provided sufficient bank, an electric computation is made to cause in Fig. 1, the disc 24 to move to the right as if through the action of centrifugal force which the trainee must overcome by increasing the bank so that the ball or disc 24 moves to the left or center position as if through the downward counteracting force of gravity. The manner in which these forces are electrically simulated to provide energization for a device such as motor 34 whose degree of movement is proportional to the simulated forces is well known in the art, and should be understood to form no part of the present invention other than as a driving means for the ball-simulating body.

Motor 34 is suitably secured in a plate 35 and operates to move disc 24 through a pinion 36 engaging a sector gear 37 rotatably mounted on a shaft 38 secured in a housing 39 fixed for the upper forward face of plate 35. Mounted coaxially on shaft 38 is the upper apertured end of a drive member 40 which is secured to the forward face of sector gear 37 by a machine screw 41. Drive member 40 has an integral forwardly extending portion 42 terminating in a downwardly extending end portion 43 containing a slot 44 embracing the rearwardly extending end of the disc supporting rod 25.

It will be observed that since drive member 40 rotates about a radius substantially less than the radius about which carriage 28 moves, slot 44 provides for lost motion between the rearward end extension of rod 25 and the inner or bearing sides of slot 44 when disc 24 is moved from the center to extreme left or right positions. The feature enables disc 24 to maintain the aforementioned proper position with respect to lens 23 and thus to present an undistorted view thereof to the pilot-trainee irrespective of disc position.

Though one embodiment of the present invention has been shown and described, it will be apparent to those skilled in the art that the same is capable of expression in a wide variety of modifications without departing from the spirit and scope of the appended claims.

What is claimed is:

1. In a turn-and-bank indicator for non-flying aircraft trainers means for simulating a normal bank indicator of the type having a ball enclosed in a transparent fluid-filled tube mounted in a dial face, said means comprising: a lens member mounted in said dial face and having an exposed front side similar in size and configuration with said fluid filled tube and having substantially the same light distorting and magnifying properties as said tube, a ball-simulating body in close proximity to the rear of said lens member, a track for supporting and guiding the ball-simulating body, and means for moving said body behind said lens along the track in response to simulated forces resulting from trainee actuation of flight controls.

2. In a turn-and-bank indicator for non-flying aircraft trainers means for simulating a normal ball bank indicator of the type having a ball enclosed in a transparent fluid-filled tube mounted in a dial face, said means comprising: a laterally disposed lens member mounted in a dial face and having an exposed front side similar in size and configuration with said fluid filled tube and having substantially the same light distorting and magnifying properties as said tube, a laterally movable ball simulating body behind said lens member and having a size and shape that when viewed through the lens member the image thereof conforms in size and shape to a normal ball for use in said fluid-filled tube, guide means including an arcuate track in spaced relationship to the rear of said dial face for supporting and guiding said body so as to maintain the same substantially vertical relationship with said lens throughout its limits of movement, and means for moving said body along the track in response to simulated forces resulting from trainee actuation of flight controls.

3. A turn-and-bank indicator for non-flying aircraft trainers having trainee actuated flight controls, comprising an instrument case, a dial face attached to the forward end of said instrument case, a turn indicator pointer pivotally mounted at one end in said instrument case and having its other end movable between left and right positions in front of said dial face, pointer actuating means in said instrument case for moving said pointer in response to trainee actuation of flight controls, a bank indicator comprising an arcuate lens member mounted in a slot in said dial face, upper and lower spaced arcuate track members secured in said instrument case behind said lens member and having a degree of curvature determined by the same center point as determines the curvature of said lens member, a carriage having flanged wheels engaging said tracks, a ball simulating body secured to said carriage and positioned thereon behind said lens member so as to be viewable therethrough, a drive motor secured in said case energizable by electrical signals proportional to simulated forces resulting from trainee actuation of flight controls, and an operating connection between said motor and said carriage to move the same on said tracks in accordance with said simulated forces.

4. The invention according to claim 3, wherein said ball-simulating body comprises a flat disc which when viewed through the lens member is the size and shape of a ball enclosed in a liquid-filled tube normally used in a ball-bank indicator employed in actual aircraft.

5. In a turn-and-bank indicator for non-flying aircraft an instrument case, a first and second driving motor mounted in said case, a dial face mounted in said case, a turn indicating scale on said dial face, a pointer pivoted in said case, gearing carried by said first motor and said pointer for rotating the latter with respect to said scale, a simulated bank indicator of the ball-bank type in said case comprising an arcuate lens member secured in said dial face and having an exposed side similar in appearance to the liquid-filled tube of a normal ball bank indicator, arcuate tracks fixed in said case behind said lens having the same degree of curvature of said lens, a carriage mounted on said tracks, a ball simulating body mounted on said carriage in a position viewable through said lens, and means driven by said second motor for moving said carriage with respect to said lens.

6. The invention according to claim 5, wherein said last named means comprises a rearwardly projecting rod secured to said carriage, a drive member having one vertical end pivotally mounted in said case and having a vertical opposite end slotted to embrace said rod, a pinion gear on the shaft of said second motor, and a sector gear fixed to the first vertical end of said drive member and engaging said pinion.

7. In a turn-and-bank indicator for non-flying aircraft trainers means for simulating a normal bank indicator of the type having a ball enclosed in a transparent fluid-filled tube mounted in a dial face, said means comprising: a lens member of transparent material mounted in said dial face, the lens member being arcuate in shape and semi-circular in section so that the member has an exposed front similar in size and configuration to said fluid filled tube, the transparent material having a light index of refraction to cause substantially the same light distorting and magnifying properties as those exhibited by the fluid filled tube, a disc mounted behind the lens member to move axially thereof which disc when viewed through the lens member appears to be of the size and shape of the ball enclosed in the fluid filled tube, and means for moving the disc along the lens in response to simulating forces resulting from actuation of the trainer flight controls.

References Cited in the file of this patent

UNITED STATES PATENTS

| | | |
|---|---|---|
| 1,138,124 | Lawrence | May 4, 1915 |
| 1,739,284 | Boyce | Dec. 10, 1929 |
| 2,369,922 | Shamah | Feb. 20, 1945 |
| 2,460,675 | Bourgaize | Feb. 1, 1949 |
| 2,467,412 | Wathen | Apr. 19, 1949 |
| 2,472,888 | Cunningham | June 14, 1949 |
| 2,541,161 | Harper | Feb. 13, 1951 |
| 2,686,979 | Benson et al. | Aug. 24, 1954 |